United States Patent [19]

Minnis et al.

[11] Patent Number: 5,262,474
[45] Date of Patent: Nov. 16, 1993

[54] AQUEOUS DIELECTRIC COATING COMPOSITIONS AND METHOD OF PRODUCING COATINGS

[75] Inventors: Ralph L. Minnis, Des Plaines; Karel Kriz, Mt. Prospect, both of Ill.

[73] Assignee: Rohm and Haas Company, Philadelphia, Pa.

[21] Appl. No.: 787,709

[22] Filed: Nov. 4, 1991

Related U.S. Application Data

[63] Continuation of Ser. No. 401,946, Sep. 1, 1989, abandoned.

[51] Int. Cl.$^5$ ............................................. C08L 31/02
[52] U.S. Cl. .................................... 524/556; 524/560
[58] Field of Search ................................ 524/556, 560

[56] References Cited

U.S. PATENT DOCUMENTS 4,478,972 10/1984 Conrady et al. ..................... 524/386
4,588,649 5/1986 Kriz et al. ............................ 524/425

OTHER PUBLICATIONS

"Trem LF-40 Reactive Anionic Surfactant Emulsion Polymerization", Diamond Shamrock Corporation.
"COPS I ™ Copolymerizable Surfactant", Alcolac pp. 1-10.

*Primary Examiner*—Joseph L. Schofer
*Assistant Examiner*—Jeffrey T. Smith
*Attorney, Agent, or Firm*—Brian W. Stegman

[57] ABSTRACT

The present invention is directed to aqueous dielectric coatings exhibiting reduced migration of the electrical ions of the conductive substrate. The coating composition comprises: (1) a binder comprising: (a) an aqueous polymerizable emulsion comprising: at least one monoethylenically unsaturated monomer; a monoethylenically unsaturated acid; and a copolymerizable surfactant; and (b) a volatile base and (2) a pigment.

15 Claims, No Drawings

5,262,474

AQUEOUS DIELECTRIC COATING COMPOSITIONS AND METHOD OF PRODUCING COATINGS

This application is a continuation of U.S. application Ser. No. 401,946, filed Sep. 1, 1989, now abandoned.

TECHNICAL FIELD

This invention relates to aqueous coating compositions suitable as dielectric coatings In particular, the present invention is directed to coating compositions which when applied to conductive substrates provide good print densities. A method of producing dielectric coatings from the compositions is also disclosed.

BACKGROUND OF THE INVENTION

Electrostatic recording systems are utilized in equipment such as facsimiles, computer input-output systems, high speed graphic reproduction systems, and the like to fix the electronic signal received by the equipment in a form which people can interpret. The signal is fixed on electrostatic recording materials that comprise a highly dielectric layer, that serves as an electric-charge-retentive layer, and an electrically conductive substrate that supports the dielectric layer. Electrostatic images of electrical signals formed on the dielectric layer are conventionally made visible with a developer comprising a toner and a carrier that has a polarity opposite to the polarity of the electrostatic image charge.

The dielectric layer is conventionally produced from a pigmented dispersion applied onto the conductive substrate comprising high molecular weight materials and pigments dissolved in organic solvents.

Representative high molecular weight materials include polystyrenes, polyacrylates, polyvinylidene chlorides, polyvinyl acetates, polyvinyl acetals, nitrocelluloses and silicone resins The pigment assists adherence of the toner to the electrostatic recording material. Representative pigments include calcium carbonate (atomite), kaolin clay and the like. Representative organic solvent are acetone, toluene, benzene, methylethyl ketone, and the like. However, the use of such organic solvents is disadvantageous because of the flammability, health hazards and expense thereof.

To avoid these disadvantages of organic solutions some attempts have been made to use aqueous coating compositions to form the dielectric layer on the conductive substrate. However, the electrical ions of the electrically conductive agent on the surface of, or in, the conductive substrate can migrate into the dielectric coating produced from the aqueous coating composition which results in the degradation of the electrostatic characteristics of the dielectric layer. Thus, using such aqueous compositions involves serious defects such as deterioration in the charge retention and dielectric properties of the dielectric layer which results in poor print densities.

Attempts have been reported wherein a barrier layer is formed between the electrically conductive layer of the conductive substrate and the dielectric layer to prevent migration of the electrically conductive agent into the dielectric layer. However, a barrier layer results in (1) an economic disadvantage due to the additional step of applying the layer, and (2) a functional defect due to the decrease in recording sensitivity of the dielectric layer.

SUMMARY OF THE INVENTION

The present invention provides aqueous coating compositions suitable as dielectric coatings and a method for producing these dielectric coatings that overcome the shortcomings of the aforementioned prior art coating compositions and methods.

The coating compositions comprise: (1) a binder comprising (a) an emulsion comprising: at least one monoethylenically unsaturated monomer; a monoethylenically unsaturated acid present in the binder in an amount of about 5 or more weight percent of the emulsion on an active constituent basis; and a copolymerizable surfactant; and (b) a volatile base; and (2) a pigment in a weight ratio of pigment: binder of about 0.5:1, respectively, or more. Preferably, the monoethylenically unsaturated monomer of the emulsion is an ester of (meth)acrylic acid and a $C_2$ to $C_6$ alcohol, more preferably an admixture of butyl methacrylate and butyl acrylate. The glass transition temperature of the monoethylenically unsaturated monomer is preferably about $-10°$ C. or less.

A method for the production of electrostatic recording materials useful in electrostatic recording systems is also disclosed. The method comprises the step of coating an electrically conductive substrate with an effective dielectric layer forming amount of the present coating composition. The aqueous coating composition can be conventionally applied and dried to produce the dielectric layer. The conductive substrate can be paper, nonwoven fabric, and the like which is conventionally treated to render it electrically conductive.

While desiring not to be bound by any theory, it is presently believed that upon copolymerization the surfactant loses its ionic nature and thus does not migrate or carry electrical ions within the dielectric coating and inhibits migration of the electrical ions of the conductive agent into the dielectric layer. Good image quality is thus obtained during the dielectric copying process because the electrical charge of the coating remains on the surface of the dielectric layer and is more readily available to attract the toner.

The binder can be produced utilizing conventional constituents such as reducing agents, oxidizing agents, thickeners, and the like.

Good print densities are obtained utilizing the present coating compositions.

DETAILED DESCRIPTION OF THE PREFERRED EMBODIMENTS

Although this invention is susceptible to embodiment in many different forms, some preferred embodiments of the invention will be discussed in detail. It should be understood, however, that the present disclosure is to be considered as an exemplification of the principles of this invention and is not intended to limit the invention to the embodiments illustrated.

This invention is directed to aqueous coating compositions useful as dielectric coatings. The compositions comprise: (1) a binder comprising (a) an emulsion comprising: at least one monoethylenically unsaturated monomer; a monoethylenically unsaturated acid; and a copolymerizable surfactant; and (b) a volatile base; and (2) a pigment. A method for the production of electrostatic recording materials suitable in electrostatic recording systems is also disclosed. The method comprises the step of coating an electrically conductive substrate with an effective dielectric layer forming amount of the aqueous coating composition.

The monoethylenically unsaturated monomers [monomer(s)] suitable for use in the emulsion are conventional and are known for the production of water dispersible polymers and copolymers. Suitable monomers are (meth)acrylates, alkylvinyl ethers, vinyl substituted aromatics, and the like. Mixtures of these monomers can also be utilized.

The term "(meth)acrylate", as used in its various grammatical forms, identifies an ester that is the reaction product of acrylic or methacrylic acid and a hydroxy containing compound such as an alcohol, glycol, the like and mixtures thereof.

The glass transition temperature ($T_g$) of the monomer, or an admixture of monomers, is preferably about $-10°$ C. or less. The $T_g$ of the monomer influences the flexibility of the coating. A relatively low $T_g$ imparts additional flexibility to the coating which is desirable.

The term "glass transition temperature", in its various grammatical forms, is defined as the temperature at which a homopolymer of the referenced material, or copolymer of the referenced materials, changes from a vitreous state to a plastic state.

Illustrative of suitable monomers are ethyl (meth)acrylate, isobutyl (meth)acrylate, n-butyl (meth)acrylate, pentyl (meth)acrylate, butylvinyl ether, methylvinyl ether, styrene, vinyl toluene, and the like. Mixtures of these monomers are also suitable.

Preferred monomers are the (meth)acrylates that are the reaction product of acrylic or methacrylic acid and a $C_2$ to $C_6$ alcohol, e.g., ethanol, propanol and hexanol. Butyl methacrylates and butyl acrylates are preferred. The methacrylates provide a coating having an increase in hardness as compared to the acrylates. Thus, an admixture of methacrylates and acrylates is preferred. The weight ratio of methacrylate:acrylate is preferably about 3:1 to about 1:1.5, more preferably about 2:1 to about 1:1, respectively.

The emulsion composition also includes a monoethylenically unsaturated acid. The acid can be a monocarboxylic or polycarboxylic acid with monocarboxylic acids presently being preferred. Suitable acids include acrylic acid, methacrylic acid, fumaric acid, crotonic acid, maleic acid, malic acid, tartaric acid, and the like. Mixtures of these acids can also be utilized. Presently, acrylic acid and methacrylic acid are preferred.

The copolymerizable surfactant is selected to disperse, and copolymerize with, the monomer in water and not adversely effect dielectric printing. Conventional surface-active agents substituted with at least one group that is reactive with the monomer are suitable for use as the copolymerizable surfactant. Illustrative surface-active agents are the sulfosuccinates, sulfonates, phosphates, the like and mixtures thereof. Illustrative reactive groups include allyl groups, vinyl groups, the like and mixtures thereof.

The surfactant can be ionic and are preferably anionic.

Illustrative copolymerizable surfactants are commercially available from the Henkel Corporation, Morristown, NJ under the trade designation TREM LF-40 and Sanyo Chemical Industries, Japan, under the trade designation ELEMINOL JS-2. Both TREM LF-40 and ELEMINOL JS-2 are sodium alkyl allyl sulfosuccinates supplied as aqueous compositions containing 40 weight percent of the sulfosuccinate. Air Products & Chemicals, Inc., Allentown, PA has a commercially available sodium vinyl sulfonate solution which is a suitable copolymerizable surfactant. The Alcolac, Baltimore, MD, product COPS I ™ is a sodium salt of a short chain vinyl sulfonate which is also suitable for use herein as the copolymerizable surfactant.

The water utilized is preferably deionized or distilled.

The monomer is present in the emulsion in an amount in the range of about 65 to about 95, preferably about 75 to about 90, weight percent based on the total weight, on an active constituents basis, of the emulsion.

The term "active constituents", as used in its various grammatical forms, refers to the constituents other than water.

The acid is present in the emulsion in an amount in the range of about 5 to about 15, preferably about 7 to about 13, weight percent based on the total weight, on an active constituents basis, of the emulsion.

The copolymerizable surfactant is present in the emulsion in an amount in the range of about 1 to about 10, preferably about 3 to about 8, weight percent based on the total weight, on an active constituents basis, of the emulsion.

The weight average molecular weight of the emulsion is preferably about 500,000 to about 1,500,000, more preferably about 750,000 to about 1,250,000.

A volatile base can be present in an amount effective to neutralize the pH value of the binder to about 7. Neutralization enhances water dispersion and helps maintain the dispersion when a pigment is present. Suitable volatile bases include volatile amines, sodium hydroxide, dimethyl sulfoxide, the like and mixtures thereof. Illustrative of the volatile amines are ammonia, tertiary amines, e.g., triethyl amine, ammonium hydroxide, and the like. Presently, ammonium hydroxide is preferred.

The binders of the present aqueous coating composition can be prepared by reacting the emulsion with other conventional constituents such as catalysts, reducing agents, oxidizing agents, thickeners, neutralizers, and the like, typically in a redox or reflux emulsion copolymerization.

Suitable catalysts include water-soluble metal catalysts, e.g., ferrous sulfate.

Suitable reducing agents include sodium formaldehyde sulfoxylate.

Suitable oxidizing agents include peroxides, e.g., t-butylhydroperoxide, and the persulfates, e.g., ammonium, potassium and sodium persulfates.

A thickener can also be present to help achieve coating viscosity. An illustrative thickener is EXP 300, commercially available from Rohm and Haas.

The emulsion is present in the binder in an amount in the range of about 45 to about 85, preferably about 50 to about 80, weight percent based on the weight of the active constituents in the binder.

The volatile base is present in the binder in the range of about 10 to about 20, more preferably 12 to about 18, weight percent based on the weight of the active constituents in the binder.

The catalyst can be present in the binder in an amount less than about 0.1, preferably less than about 0.5, weight percent based on the weight of the active constituents in the binder.

The reducing agent can be present in the binder in an amount in the range of about 5 to about 15 weight percent based on the weight of the active constituents in the binder.

The oxidizing agent can be present in the binder in an amount in the range of about 3 to about 10 weight percent based on the weight of the active constituents in the binder.

The thickener can be present in the binder in an amount in the range of about 1 to about 5 weight percent based on the weight of the active constituents in the binder.

The binder further includes distilled or deionized water in a quantity sufficient to produce a binder having an active constituents content of about 20 to about 55, preferably about 30 to about 50, weight percent.

The viscosity of the binder is in a range of about 80 to about 120 centipoise (cp), preferably about 90 to about 110 cp, as measured at 25° C. utilizing a Brookfield viscometer.

The particle size of the binder is preferably about 85 to about 170, preferably about 90 to about 160 nanometers (nm).

An illustrative method of producing the binder is as follows. The water and the catalyst are admixed in a suitable reaction vessel, typically a 4-neck flask. The emulsion is made by admixing the monoethylenically unsaturated monomer, the monoethylenically unsaturated acid, the copolymerizable surfactant and water in a separate suitable vessel. Solutions of the reducing agent and the oxidizing agent are prepared by admixing the respective agents with water in separate vessels. The emulsion, reducing agent solution and oxidizing agent solution are added simultaneously by distinct addition streams to the reaction vessel over an extended time period. The temperature of the reactants in the reaction vessel is maintained at a temperature of about 60° to about 80° C. Addition of the emulsion, reducing solution and oxidizing solution by separate streams over an extended time period permits easier temperature control. The time period over which these solutions are added to the reaction vessel depends upon the quantity of binder being produced and is conventionally determined. After all of these solutions have been introduced into the reaction vessel, the temperature is maintained at a temperature, and for a time period, sufficient to complete copolymerization. The temperature and time period are interrelated, dependent upon batch size and can be conventionally determined. After copolymerization is completed, the temperature of the copolymer is reduced to a temperature in the range of about 40° to about 60° C. Thereafter, an aqueous solution of the thickener is admixed with the copolymer. The temperature of the thickened copolymer is then further reduced to about ambient temperature, i.e., about 20° to about 30° C. The thickened copolymer can then be neutralized with the volatile base to a pH value of about 7 to produce the binder.

An alternative emulsion copolymerization technique is to utilize water-soluble initiators which decomposes upon heating to generate free radicals. The aforementioned persulfates and azo bis type initiators, e.g., 4,4'-azo bis 4 cyanovalenic, are illustrative of such initiators and can be used in place of the reducing agent, catalyst and the oxidizing agent.

The aqueous coating composition of the present invention is prepared by admixing the binder with the pigment in the desired proportions. Illustrative pigments include calcium carbonate (atomite), kaolin clay, the like and mixtures thereof.

The weight ratio of pigment: binder is about 0.5:1, respectively, or more. The weight ratio of pigment: binder is preferably about 0.5:1 to about 3:1, respectively.

All weight ratios for the pigment: binder ratio are based on a the dry weight of the pigment and on the weight of the active constituents of the binder.

A weight ratio of pigment: binder of about 1:1, respectively, will produce an aqueous coating composition having a viscosity of about 300 to about 700 cp. The viscosity can be reduced by adding additional water.

The coating composition is applied to an electrically conductive substrate by conventional means and dried. Preferably, about 4 to about 6 pounds of the coating composition is applied per 3000 square feet of the substrate.

The quality of electrostatic recording materials is conventionally determined by applying an electrical charge by Corona discharge. The retained surface voltage can be measured by a Monroe electrostatic voltmeter available from Monroe Co., RI. Two indications that the electrostatic recording materials will have a good print density are (1) a high surface voltage retention and (2) a long time period for which this voltage is retained. The electrostatic recording materials produced utilizing the present coating composition retain a relatively high surface voltage for an time period effective to result in improved print density.

The following Example is presented by way of illustration of the present invention and not limitation.

EXAMPLE 1

Preparation of the Aqueous Coating Composition

The reaction vessel utilized was a three liter 4-necked flask having an agitator extending therein and having a controllable heat source positioned around the flask. The reactants, and proportion thereof, of the binder are presented in TABLE I, below. Agitation and heating were maintained throughout the preparation of the binder. All water utilized was deionized water. The water (628 grams) and the ferrous sulfate catalyst were introduced into the reaction vessel.

The emulsion solution, reducing agent solution and oxidizing agent solution were prepared in three separate vessels. The emulsion comprised n-butyl methacrylate, butyl acrylate, methacrylic acid, TREM LF-40 (the copolymerizable surfactant) and water.

The reducing agent solution comprised sodium formaldehyde sulfoxylate and water.

The oxidizing agent solution comprised t-butyl hydroxoperoxide and the water.

The three solutions were introduced into the reaction vessel via separate streams over an extended time period of about two hours. The temperature of the reactants in the reaction vessel was maintained at a temperature of about 70° C.±10° C.

After all of the solutions were introduced into the reaction vessel, the temperature of the reactants in the reaction vessel are maintained at a temperature, and at that temperature for a time period, sufficient to complete copolymerization. For this particular batch, the temperature was maintained at about 65° C. for a time period of about three hours. After completion of the copolymerization reaction, the temperature was reduced to about 50° C.

Thereafter, an aqueous solution of the EXP 300 thickener was slowly introduced into the reaction vessel. After a substantially homogeneous admixture was produced, the temperature thereof was lowered to about ambient temperature.

The ammonium hydroxide was then introduced into the reaction vessel to adjust the pH value to about 7.

TABLE I

| AQUEOUS COATING COMPOSITION | |
|---|---|
| Reactant | Proportion (grams) |
| Water | 628 |
| Ferrous Sulfate | 0.02 |
| Emulsion | |
| Surfactant[1] | 135 |
| Butyl Methacrylate | 446 |
| Butyl Acrylate | 400 |
| Methacrylic Acid | 100 |
| Water | 600 |
| Reducing agent solution | |
| Sodium formaldehyde sulfoxylate | 6 |
| Water | 60 |
| Oxidizing agent solution | |
| t-butyl hydroperoxide | 4 |
| water | 60 |
| Thickener solution | |
| EXP 300[2] | 2.3 |
| Water | 48 |
| Ammonium hydroxide | 13.9 |

[1]Trem LF-40, a copolymerizable surfactant commercially available from the Henkel Corporation, Morristown, NJ.
[2]EXP 300, a thickener commercially available from Rohm & Haas.

Additional water was added to complete the production of the binder. The water was added in a quantity sufficient to produce a binder that had a 40 weight percent active constituents content.

The viscosity of the binder was 104 cp and was measured at 25° C. utilizing a Brookfield viscometer in accordance with the instructions provided therewith.

The particle size of the binder was about 124.5±29.5 nm.

An aliquot of the binder was then admixed with the pigment atomite in a pigment: binder weight ratio of about 1:1, respectively, to produce the aqueous coating composition.

The viscosity of the aqueous coating composition was about 500 cp at 25° C.

The present coating composition was then, conventionally applied to a conductive substrate for aqueous dielectric coatings commercially available under the designation conductive base for aqueous dielectric coatings from James River West Corp., Portland, OR and dried.

The resulting electrostatic recording material exhibits good print densities and retains a voltage of about 100 when the dielectric coating composition is applied at a coating weight of about 5 to about 6 pounds per 3000 square feet.

This invention has been described in terms of specific embodiments set forth in detail, but it should be understood that these are by way of illustration only and that the invention is not necessarily limited thereto. Modifications and variations will be apparent from the disclosure and may be resorted to without departing from the spirit of the invention, as those skilled in the art will readily understand. Accordingly, such variations and modifications of the disclosed products are considered to be within the purview and scope of the invention and the following claims.

We claim:

1. An aqueous coating composition suitable as a dielectric coating consisting essentially of: (1) a binder comprising: (a) an aqueous emulsion comprising: at least one monoethylenically unsaturated monomer; a monoethylenically unsaturated acid present in the binder in an amount of about 5 or more weight percent of the emulsion, on an active constituents basis; and a copolymerizable surfactant; and (b) a volatile base; and (2) a pigment present in a weight percent ratio of pigment: binder of from about 0.5:1 to about 3:1, respectively.

2. The coating composition in accordance with claim 1 wherein the monoethylenically unsaturated monomer is an ester of (meth)acrylic acid and a $C_2$ to $C_6$ alcohol.

3. The coating composition in accordance with claim 1 wherein the monoethylenically unsaturated monomer is an admixture of an acrylate and a methacrylate.

4. The coating composition in accordance with claim 3 wherein the acrylate is butyl acrylate and the methacrylate is butyl methacrylate.

5. The coating composition in accordance with claim 1 wherein the monoethylenically unsaturated monomer has a glass transition temperature of about $-10°$ C. or less.

6. The coating composition in accordance with claim 1 wherein the acid is a monocarboxylic acid.

7. The coating composition in accordance with claim 1 wherein the monoethylenically unsaturated monomer is present in the emulsion in an amount in the range of about 65 to about 95 weight percent on an active constituents basis, the acid is present in the emulsion in an amount in the range of about 5 to about 15 weight percent on an active constituents basis and the copolymerizable surfactant is present in the emulsion in an amount in the range of about 1 to about 10 weight percent on an active constituents basis.

8. The coating composition in accordance with claim 1 wherein the monoethylenically unsaturated monomer is present in the emulsion in an amount in the range of about 75 to about 90 weight percent on an active constituents basis, the acid is present in the emulsion in an amount in the range of about 7 to about 13 weight percent on an active constituents basis and the copolymerizable surfactant is present in the emulsion in an amount in the range of about 3 to about 8 weight percent on an active constituents basis.

9. The coating composition in accordance with claim 1 wherein the weight ratio of pigment: binder is about 0.5:1 to about 3:1, respectively.

10. An aqueous coating composition suitable as a dielectric coating consisting essentially of: (1) a binder comprising: (a) an aqueous emulsion comprising: at least one monoethylenically unsaturated monomer that is an ester of (meth)acrylic acid and a $C_2$ to $C_6$ alcohol present in the emulsion in an amount in the range of about 65 to about 95 weight percent on an active constituent basis; a monoethylenically unsaturated acid present in the emulsion in an amount in the range of about 5 to about 15 weight percent on an active constituents basis; and a copolymerizable surfactant present in the emulsion in an amount in the range of about 1 to about 15 weight percent on an active constituents basis; and (b) a volatile base; and (2) a pigment present in a weight ratio of pigment: binder of about 0.5:1 to about 3:1, respectively.

11. The coating composition in accordance with claim 10 wherein the monoethylenically unsaturated monomer is an admixture of an acrylate and a methacrylate.

12. The coating composition in accordance with claim 11 the acrylate is butyl acrylate and the methacrylate is butyl methacrylate.

13. The coating composition in accordance with claim 10 wherein the monoethylenically unsaturated monomer has a glass transition temperature of about −10° C. or less.

14. The coating composition in accordance with claim 10 the acid is a monocarboxylic acid.

15. The coating composition in accordance with claim 10 wherein the monoethylenically unsaturated monomer is present in the emulsion in an amount in the range of about 75 to about 90 weight percent on an active constituents basis, the acid is present in the emulsion in an amount in the range of about 7 to about 13 weight percent on an active constituents basis and the copolymerizable surfactant is present in the emulsion in an amount in the range of about 3 to about 8 weight percent on an active constituents basis.

* * * * *